United States Patent
Liang et al.

(10) Patent No.: US 11,221,439 B2
(45) Date of Patent: Jan. 11, 2022

(54) FLEXIBLE LIGHT PATH GUIDE DEVICE

(71) Applicant: KDH Design Co., Ltd., British Virgin Island (GB)

(72) Inventors: Wei-Young Liang, Taipei (TW); Chung-Hsien Lu, Taipei (TW)

(73) Assignee: Jarvish Pty Ltd., Victoria (AU)

( * ) Notice: Subject to any disclaimer, the term of this patent is extended or adjusted under 35 U.S.C. 154(b) by 0 days.

(21) Appl. No.: 16/858,724

(22) Filed: Apr. 27, 2020

(65) Prior Publication Data

US 2021/0333460 A1   Oct. 28, 2021

(51) Int. Cl.
*F21V 8/00* (2006.01)
*G02B 6/06* (2006.01)

(52) U.S. Cl.
CPC .......... *G02B 6/0006* (2013.01); *G02B 6/0008* (2013.01); *G02B 6/06* (2013.01)

(58) Field of Classification Search
CPC ....... G02B 6/0006; G02B 6/0008; G02B 6/06
See application file for complete search history.

(56) References Cited

U.S. PATENT DOCUMENTS

| | | | | |
|---|---|---|---|---|
| 4,398,791 A * | 8/1983 | Dorsey | ........... | G02B 6/3604 385/26 |
| 4,862,873 A * | 9/1989 | Yajima | ........... | A61B 1/00193 600/111 |
| 6,735,462 B2 * | 5/2004 | Klocek | ........... | A61B 5/015 600/407 |
| 8,214,010 B2 * | 7/2012 | Courtney | ........... | A61B 5/0062 600/407 |
| 10,307,047 B2 * | 6/2019 | Scheller | ........... | A61M 1/964 |
| 10,634,899 B2 * | 4/2020 | Gopinath | ........... | G02B 3/14 |
| 2003/0141096 A1 | 7/2003 | Saccomanno | | |
| 2004/0076394 A1 | 4/2004 | Carniel et al. | | |
| 2004/0234224 A1 | 11/2004 | Ishizaki et al. | | |
| 2006/0002108 A1 | 1/2006 | Ouderkirk et al. | | |
| 2007/0140615 A1 | 6/2007 | Tanaka et al. | | |
| 2007/0172171 A1 | 7/2007 | Van Ostrand et al. | | |
| 2010/0074579 A1 | 3/2010 | Fujii et al. | | |

OTHER PUBLICATIONS

Australian Patent Office, International-Type Search Report for International Application No. 2020903198, dated Oct. 15, 2020, 21 pages.

* cited by examiner

*Primary Examiner* — Ryan A Lepisto
(74) *Attorney, Agent, or Firm* — Bradley J. Thorson; DeWitt LLP

(57) ABSTRACT

A flexible light path guide device includes at least one light path coupling member for receiving at least one visible light and at least one flexible optical guide member having a first end, a second end extending in a direction away from the first end, a light path positioned between the first and second ends and at least one chamber positioned in the light path in adjacency to the second end. The first end is coupled with the visible light corresponding to the light path coupling member. The visible light is guided by the light path to the chamber. The chamber guides the visible light to outer side of the flexible optical guide member. Accordingly, when the visible light reaches a projected object, the effects that the visible light has high brightness and low optical energy loss and the total volume of the projection imaging device is minimized are achieved.

20 Claims, 7 Drawing Sheets

FLEXIBLE LIGHT PATH GUIDE DEVICE

BACKGROUND OF THE INVENTION

1. Field of the Invention

The present invention relates generally to a light path guide device, and more particularly to a flexible light path guide device.

2. Description of the Related Art

It is known that light has the property of straight traveling. In order to avoid low brightness and high optical energy loss when the light reaches the projected object, when designing a conventional projection imaging device, the optical guide member, that is, the waveguide is kept straight without bending. Accordingly, a research/development worker can more conveniently and accurately calculate the travel of the light.

However, the aforesaid design will lead to over-large volume of the conventional projection imaging device. Especially, the length of the optical guide member cannot be shortened. As a result, in the current time when various electronic devices and equipments are required to miniaturize, the total volume of the projection imaging device can be hardly minified.

It is therefore tried by the applicant to provide a flexible light path guide device to solve the above problem existing in the conventional projection imaging device.

SUMMARY OF THE INVENTION

It is therefore a primary object of the present invention to provide a flexible light path guide device. When visible light reaches a projected object, the flexible light path guide device can achieve the effects that the visible light has high brightness and low optical energy loss and the total volume of the projection imaging device is minimized.

To achieve the above and other objects, the flexible light path guide device of the present invention includes: at least one light path coupling member for receiving at least one visible light; and at least one flexible optical guide member disposed corresponding to the at least one light path coupling member, the at least one flexible optical guide member having a first end, a second end extending in a direction away from the first end, a light path positioned between the first and second ends and at least one chamber positioned in the light path in adjacency to the second end, the first end being coupled with the at least one visible light corresponding to the at least one light path coupling member, the visible light being guided by the light path to the at least one chamber, the at least one chamber serving to guide the at least one visible light to outer side of the at least one flexible optical guide member.

By means of the design of the present invention, when the visible light reaches the projected object, the effects that the visible light has high brightness and low optical energy loss and the total volume of the projection imaging device is minimized can be achieved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
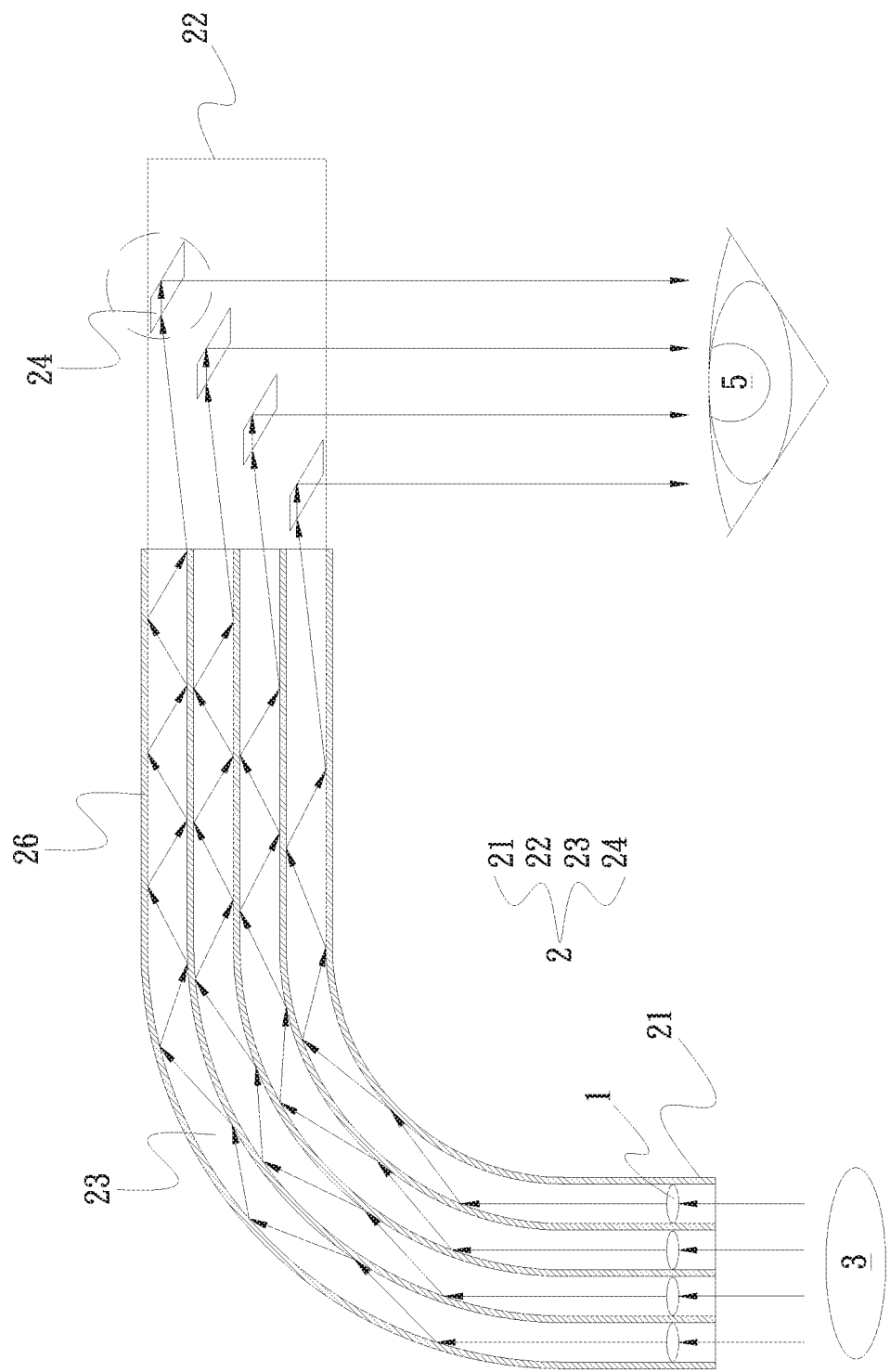
FIG. 1 is a side view of a first embodiment of the flexible light path guide device of the present invention.

Please refer to FIG. 1, which is a side view of a first embodiment of the flexible light path guide device of the present invention. As show in the drawing, the flexible light path guide device of the present invention includes at least one light path coupling member 1 and at least one flexible optical guide member 2. The at least one flexible optical guide member 2 is disposed corresponding to the at least one light path coupling member 1. The at least one light path coupling member 1 serves to receive at least one visible light emitted from at least one optical projection system 3. The at least one optical projection system 3 is disposed corresponding to the at least one light path coupling member 1. The wavelength of the at least one visible light ranges from 380 nm to 750 nm. In addition, the at least one visible light is visible by human eyes after processed and is an image light emitted from the optical projection system 3.

In this embodiment, there are, but not limited to, four light path coupling members 1 and four flexible optical guide members 2 and one optical projection system 3 for illustration purposes only. In practice, alternatively, there is one light path coupling member 1 corresponding to one flexible optical guide member 2, there are multiple light path coupling members 1 corresponding to one flexible optical guide member 2, there is one light path coupling member 1 corresponding to multiple flexible optical guide members 2, there is one optical projection system 3 corresponding to one light path coupling member 1, there are multiple optical projection systems 3 corresponding to one light path coupling member 1 or there is one optical projection system 3 corresponding to multiple light path coupling members 1.

The light path coupling member 1 serves to receive the visible light and adjust the visible light to a predetermined traveling path or angle. In this embodiment, the light path coupling member 1 is, but not limited to, a lens. In a modified embodiment, the light path coupling member 1 can alternatively an optical structure composed of multiple stacked equivalent lenses, an array composed of multiple arranged equivalent lenses, an array composed of multiple arranged equivalent lens sets or any combination thereof. The equivalent lenses are selected from a group consisting of plane lenses, plane diffractive lenses, positive refraction index lenses, negative refraction index lenses, spherical lenses, aspherical lenses, symmetrical biconvex lenses, asymmetrical biconvex lenses, plano-convex lenses, concavo-convex lenses, symmetrical biconcave lenses, asymmetrical biconvex lenses, plano-concave lenses, convexo-concave lenses and any optical member utilizing the structure or material change to change the light path direction so as to achieve the function equivalent to the lens. The light path coupling member 1 can be selectively a collimation member for adjusting the visible light into parallel. Alternatively, the light path coupling member 1 can be selectively a member for converging or diverging the visible light.

The optical projection system 3 serves to project a visible light. The arrows represent the visible light in the drawing. In this embodiment, the optical projection system 3 is, but not limited to, an organic light-emitting diode (OLED) display. In a modified embodiment, the optical projection system 3 can be alternatively a light-emitting diode (LED) display, a micro light-emitting diode display, an MEMS controlled laser projector, a liquid crystal on silicon (LCoS) projector, a thin film transistor liquid crystal display (TFT-LCD), a digital light processing (DLP) projector or any combination thereof. In this embodiment, the optical projection system 3 is, but not limited to, one single optical projection system 3. In a modified embodiment, the optical projection system 3 can be alternatively an array composed of multiple arranged optical projection systems 3. Each flexible optical guide member 2 has a first end 21, a second end 22, a light path 23 and a chamber 24. The first and second ends 21, 22 are respectively positioned at two opposite ends of the flexible optical guide member 2. The second end 22 outward extends from the first end 21. In other words, the second end 22 extends in a direction away from the first end 21. The light path 23 is positioned between the first and second ends 21, 22. The chamber 24 is positioned in the light path 23 in adjacency to the second end 22. The first end 21 of the flexible optical guide member 2 is coupled with the visible light corresponding to the light path coupling member 1. The visible light is guided by the light path 23 to the chamber 24. The chamber 24 serves to guide the visible light to a projected object 5 outside the flexible optical guide member 2 to form an image.

A surface-treatment is selectively applied to an outer surface 26 of the flexible optical guide member 2 or a structure with different refractive index is added to the surface of the flexible optical guide member 2 to form a total reflection surface or a transflective surface. The surface-treatment includes a coating such as electroplated gold coating. The structure with different refractive index includes a metal layer. The flexible optical guide member 2 is free from the total reflection surface or the transflective surface in the position corresponding to the chamber 24 and the projected object 5, whereby the flexible optical guide member 2 is applicable to glasses, helmet visor and head-up display.

In this embodiment, the outer surface of the flexible optical guide member 2 is, but not limited to, a total reflection surface, whereby the visible light traveling through one of the flexible optical guide members 2 will not interfere with another flexible optical guide member 2. In a modified embodiment, the outer surface of the flexible optical guide member 2 can be a transflective surface, whereby the visible light in one of the flexible optical guide members 2 can mix with the visible light in another flexible optical guide member 2 to achieve different imaging display effect.

In this embodiment, the flexible optical guide member 2 is, but not limited to, an array composed of multiple arranged flexible optical guide members 2. In a modified embodiment, the flexible optical guide member 2 can be one single flexible optical guide member 2.

The flexible optical guide member 2 is made of a polymer material selected from a group consisting of plastic, glass, quartz, polydimethylsiloxane (PDMS), complex material and any combination thereof. In addition, the flexible optical guide member 2 is selectively made by means of 3D printing, etching, accumulation, crystal growth, brushing, molding, cutting, milling or any combination thereof.

In this embodiment, the light path coupling member 1 is, but not limited to, integrally formed with the first end 21 of the flexible optical guide member 2. In a modified embodiment, the light path coupling member 1 can be alternatively formed outside the first end 21 of the flexible optical guide member 2.

The flexible optical guide member 2 is a solid transparent bar-shaped structure. Actually, the incidence angle of the visible light of the optical projection system 3 in the light path 23 can be adjusted to travel linearly or in Z-shape of total reflection. To facilitate the description, the traveling direction of the visible light is indicated by one single arrow.

In the drawings, the flexible optical guide member 2 is, but not limited to, a bending structure only as an example. In a modified embodiment, the flexible optical guide member 2 can be an otherwise bending structure.

Figure 2:
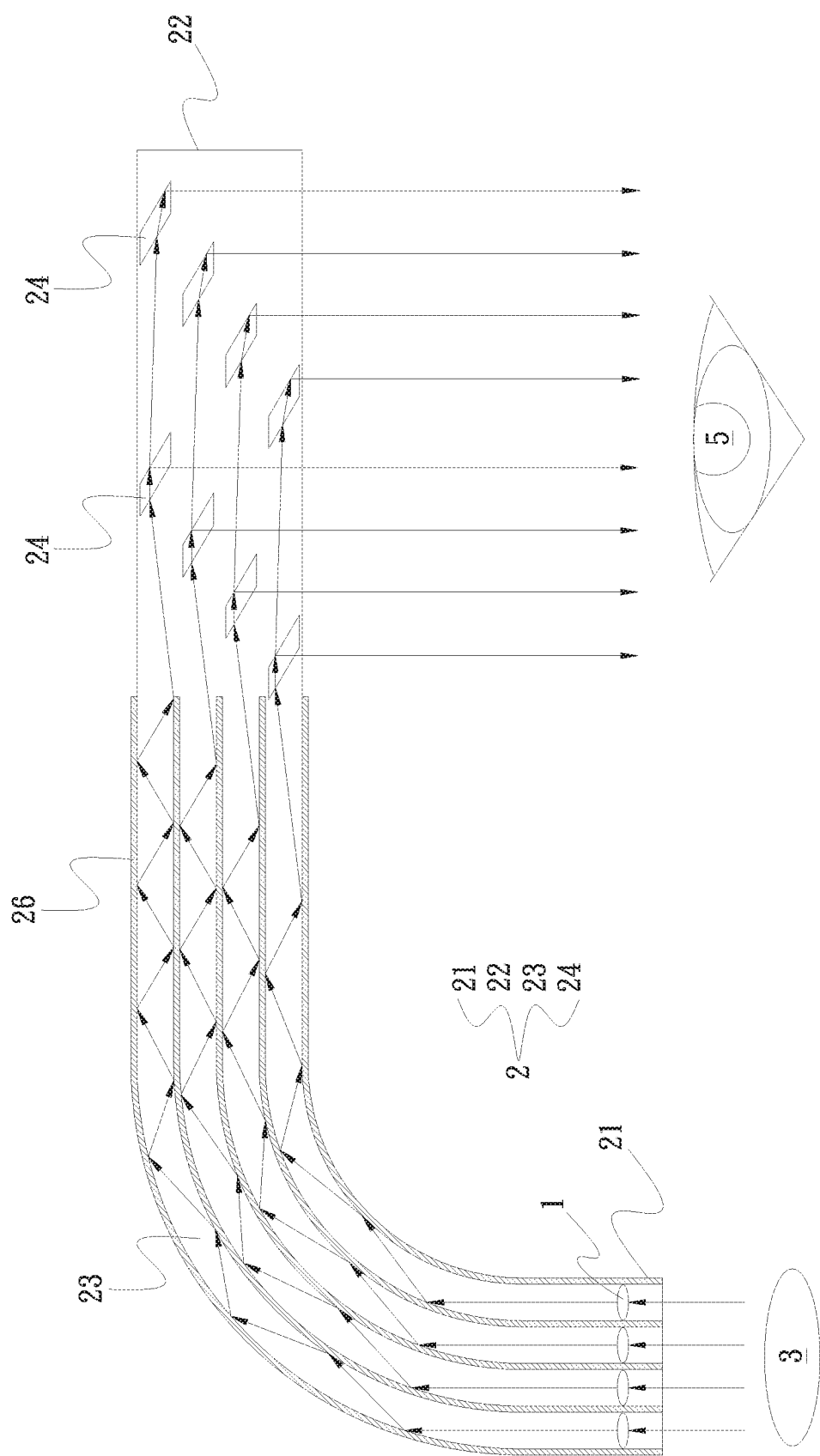
FIG. 2 is a side view of a modified embodiment of the first embodiment of the flexible light path guide device of the present invention.

In this embodiment, one single chamber 24 is, but not limited to, correspondingly formed in the light path 23 of each flexible optical guide member 2. In a modified embodiment, in the light path 23 of each flexible optical guide member 2 is formed a chamber set composed of multiple stacked chambers (as shown in FIG. 2) or an array composed of multiple arranged chambers or an array composed of multiple arranged chamber sets or any combination thereof.

Figure 3:
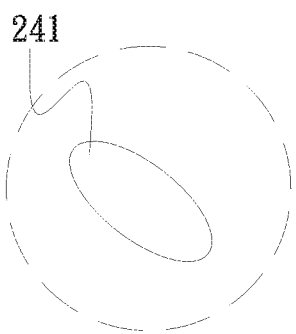
FIG. 3 is a side sectional view of the first embodiment of the flexible light path guide device of the present invention.
Figure 4:
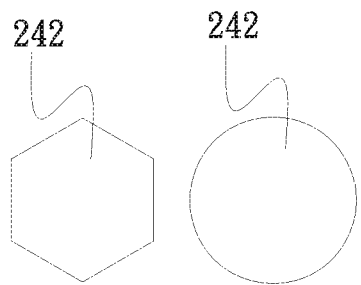
FIG. 4 is a front end view of the first embodiment of the flexible light path guide device of the present invention.
Figure 5:
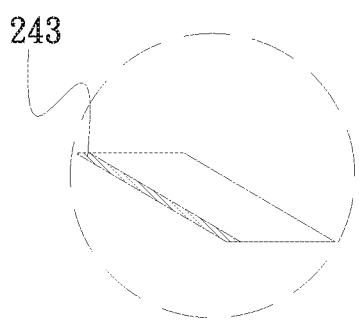
FIG. 5 is a view of the coating of the first embodiment of the flexible light path guide device of the present invention.
Figure 6:
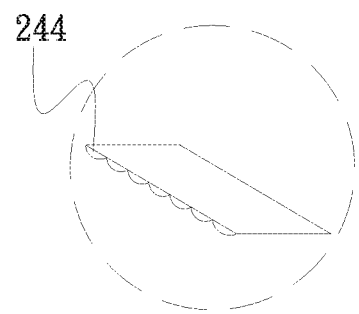
FIG. 6 is a view of the crystal grain arrangement of the first embodiment of the flexible light path guide device of the present invention.
Figure 7:
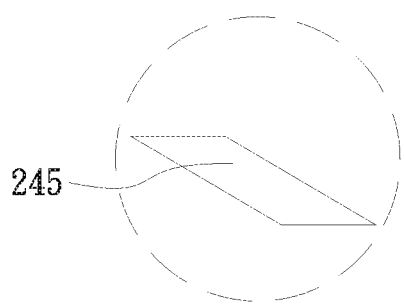
FIG. 7 is a view of the vacuum chamber of the first embodiment of the flexible light path guide device of the present invention.
Figure 8:
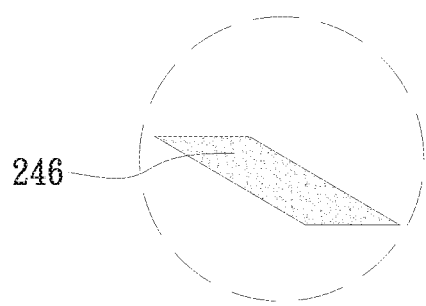
FIG. 8 is a view of the gas chamber of the first embodiment of the flexible light path guide device of the present invention.
Figure 9:
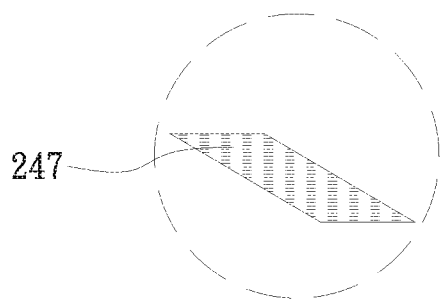
FIG. 9 is a view of the liquid chamber of the first embodiment of the flexible light path guide device of the present invention.

The chambers of the flexible optical guide members 2 respectively have identical or different optically designed structures. The optically designed structures include side view cross-sectional shape 241 (as shown in FIG. 3), front end face view shape 242 (as shown in FIG. 4), coating 243 (as shown in FIG. 5), crystal grain arrangement 244 (as shown in FIG. 6) and filling. The filling is selected from a group consisting of vacuum 245 (as shown in FIG. 7), gas 246 (as shown in FIG. 8) and liquid 247 (as shown in FIG. 9) and any combination thereof. Through the same or different optically designed structures, the imaging shape and size of the visible light on the projected object 5 can be changed. Also, the function of forming phantom image and real image and modification of the image can be achieved. Accordingly, the effect such as different distances of imaging focal plane of different depths of field can be achieved. In addition, in this embodiment, the coating 243 and the crystal grain arrangement are, but not limited to, disposed on outer surface of one side of the chamber 24. In a modified embodiment, the coating 243 and the crystal grain arrangement can be alternatively disposed on inner and outer surfaces of any side of the chamber 24.

In this embodiment, the projected object 5 is, but not limited to, an eye. In a modified embodiment, the projected object 5 can be alternatively the surface of any real body article or another optical system (such as, but not limited to, a lens or a lens set), such as a lampshade or a protection glass. The surface of the real body article can be transparent, semitransparent or nontransparent. In addition, the surface of the real body article can have the form of a curved face or non-curved face.

By means of the design of the present invention, when the visible light emitted from the optical projection system reaches the projected object, the effects that the visible light has high brightness and low optical energy loss and the total volume of the projection imaging device is minimized can be achieved.

Figure 10:
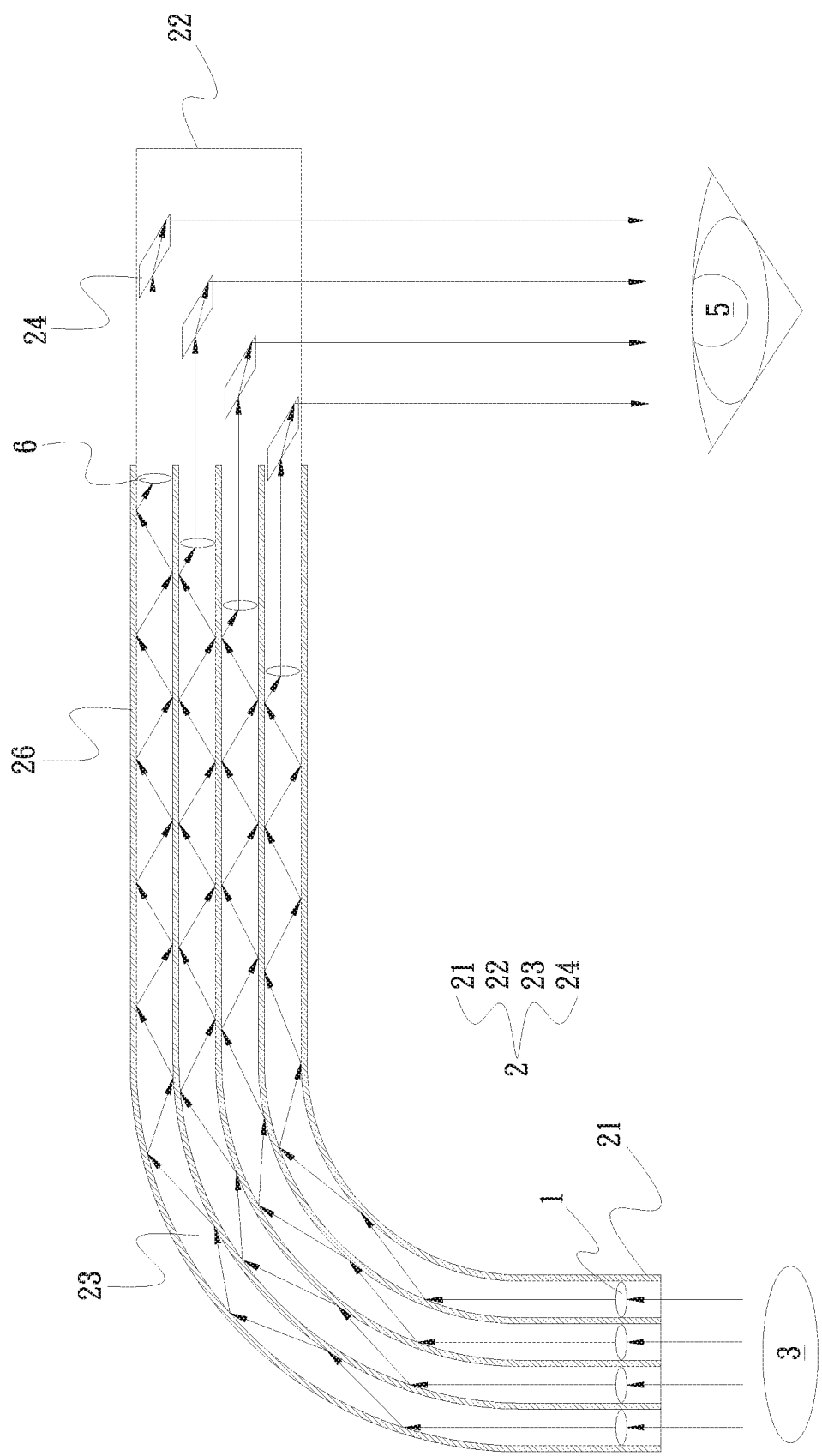
FIG. 10 is a side view of a second embodiment of the flexible light path guide device of the present invention.

Please refer to FIG. 10, which is a side view of a second embodiment of the flexible light path guide device of the present invention. Also referring to FIGS. 1 to 9, the second embodiment is partially identical to the first embodiment in structure and function and thus will not be redundantly described hereinafter. The second embodiment is different from the first embodiment in that the flexible light path guide device includes at least one refractive member 6 selectively disposed in any position of the light path 23 between the light path coupling member 1 and the chamber 24 of each flexible optical guide member 2.

Figure 11:
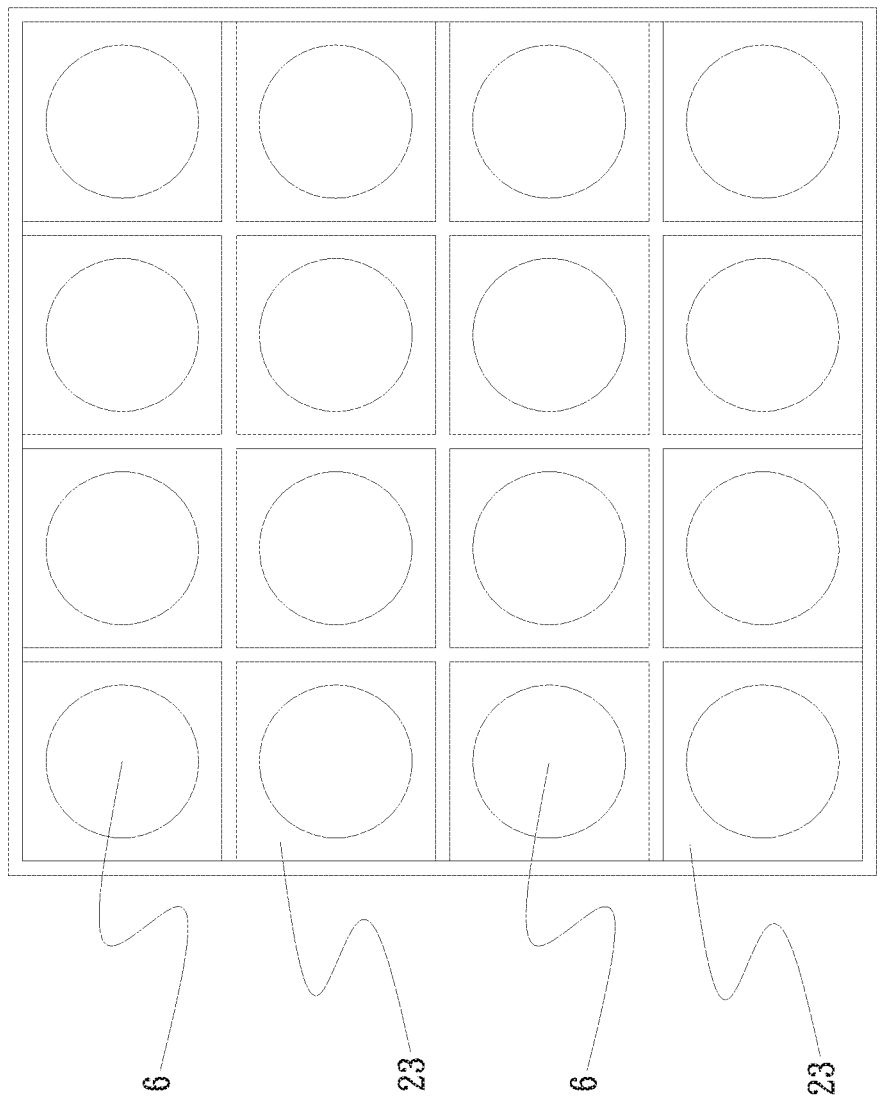
FIG. 11 is a view of the refractive members of a second embodiment of the flexible light path guide device of the present invention.
Figure 12:
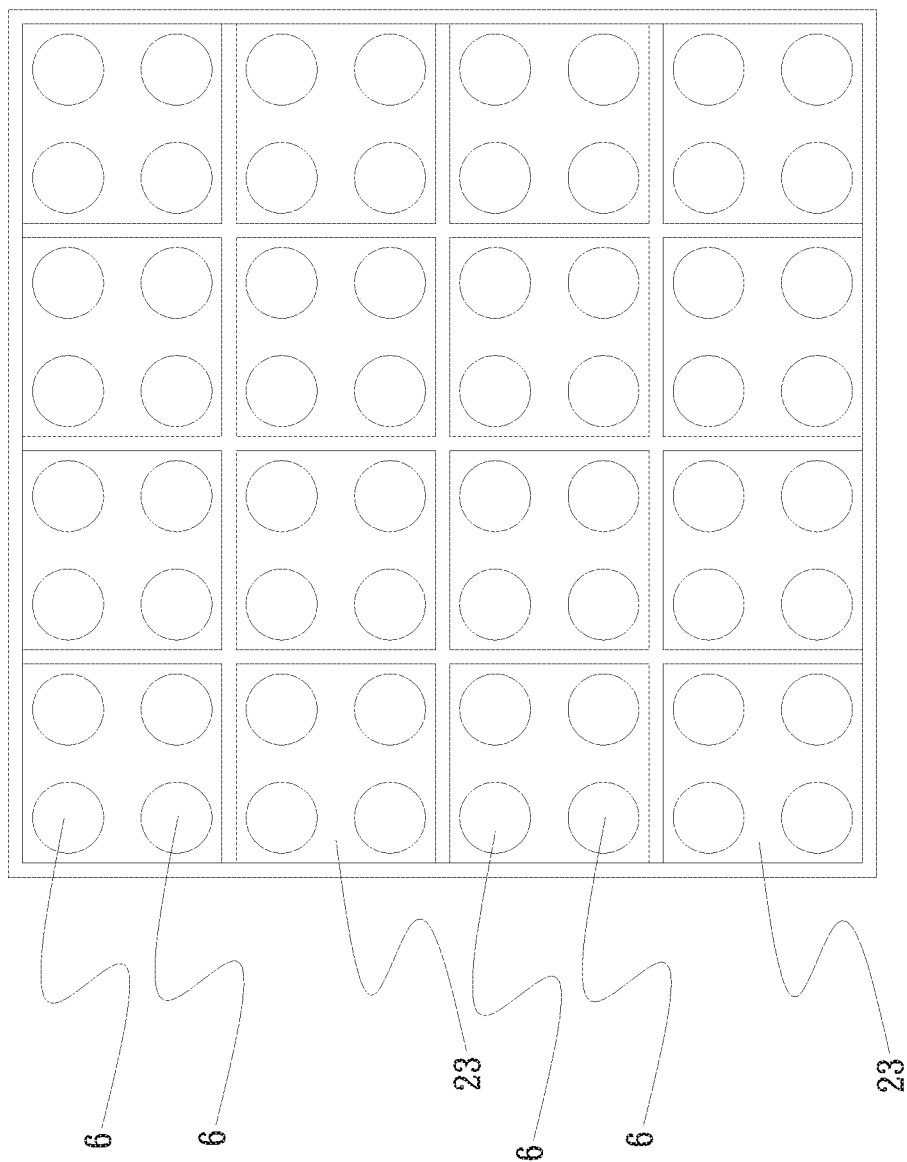
FIG. 12 is a view of the refractive members of a second embodiment of the flexible light path guide device of the present invention.

In this embodiment, there is one refractive member 6 disposed in each flexible optical guide member 2 (as shown in FIG. 11). However, this is not limited. In a modified embodiment, there are multiple refractive members 6 disposed in each flexible optical guide member 2 (as shown in FIG. 12). In this embodiment, the refractive member 6 is, but not limited to, a lens. In a modified embodiment, the refractive member 6 can be selected from a group consisting of a lens set composed of multiple stacked lenses, an array composed of multiple arranged lenses, an array composed of multiple arranged lens sets, a transflective layer, a transflective layer set composed of multiple stacked transflective layers, an array composed of multiple arranged transflective layers, an array composed of multiple arranged transflective layer sets and any combination thereof. Accordingly, after the visible light passes through the refractive member 6, the angle or wavelength of the visible light projected to the chamber 24 can be adjusted.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A flexible light path guide device comprising:
    at least one light path coupling member for receiving at least one visible light; and
    multiple flexible optical guide members disposed corresponding to the at least one light path coupling member, each flexible optical guide member having a first end, a second end extending in a direction away from the first end, a light path positioned between the first and second ends and at least one chamber positioned in the light path within the flexible optical guide member in adjacency to the second end, the first end being coupled with the at least one visible light corresponding to the at least one light path coupling member, the visible light being guided by the light path to the at least one chamber, the at least one chamber serving to guide the at least one visible light to an outer side of the flexible optical guide member; and
    at least one refractive member disposed in the light path within each flexible optical guide member, between the at least one light path coupling member and the at least one chamber, the at least one refractive member for adjusting an angle or wavelength of the at least one visible light, wherein each flexible optical guide member is an optical waveguide made from a solid transparent material.

2. The flexible light path guide device as claimed in claim 1, further comprising at least one optical projection system for projecting the at least one visible light, the at least one optical projection system being disposed corresponding to the at least one light path coupling member.

3. The flexible light path guide device as claimed in claim 2, wherein the at least one optical projection system is selected from a group consisting of a light-emitting diode display, an organic light-emitting diode display, a micro light-emitting diode display, a MEMS controlled laser projector, a liquid crystal on silicon projector, a thin film transistor liquid crystal display, a digital light processing project or and any combination thereof.

4. The flexible light path guide device as claimed in claim 2, wherein the at least one optical projection system is one single optical projection system or an array composed of multiple arranged optical projection systems.

5. The flexible light path guide device as claimed in claim 4, wherein the multiple visible lights have equal wavelength or different wavelengths.

6. The flexible light path guide device as claimed in claim 1, wherein the wavelength of the at least one visible light ranges from 380 nm to 750 nm.

7. The flexible light path guide device as claimed in claim 1, wherein the at least one light path coupling member is formed outside the first ends of the flexible optical guide members or integrally formed with the first ends of the flexible optical guide members.

8. The flexible light path guide device as claimed in claim 1, wherein the at least one light path coupling member is selected from a group consisting of a lens, a lens set composed of multiple stacked lenses, an array composed of multiple arranged lenses, an array composed of multiple arranged lens sets and any combination thereof.

9. The flexible light path guide device as claimed in claim 1, wherein the multiple of flexible optical guide members are selectively a multiple of flexible optical guide members arranged in parallel to each other or an array composed of multiple arranged flexible optical guide members.

10. The flexible light path guide device as claimed in claim 1, wherein a surface-treatment is selectively applied to an outer surface of each flexible optical guide member or a structure with different refractive index is added to the surface of each flexible optical guide member to form a total reflection surface or a transflective surface.

11. The flexible light path guide device as claimed in claim 1, wherein each flexible optical guide member is made of a polymer material.

12. The flexible light path guide device as claimed in claim 1, wherein each flexible optical guide member is selectively made by means of 3D printing, etching, accumulation, crystal growth, brushing, molding, cutting, milling or any combination thereof.

13. The flexible light path guide device as claimed in claim 1, wherein the at least one chamber is selected from a group consisting of one single chamber, a chamber set composed of multiple stacked chambers, an array composed of multiple arranged chambers, an array composed of multiple arranged chamber sets and any combination thereof.

14. The flexible light path guide device as claimed in claim 1, wherein the chambers of the multiple flexible optical guide members respectively have identical or different optically designed structures, the optically designed structures including cross-sectional shape, end face shape, filling, coating and crystal grain arrangement, whereby through the same or different optically designed structures of the chambers, the visible light images outside the second end in positions spaced from the second end by different distances.

15. The flexible light path guide device as claimed in claim 14, wherein the filling is selected from a group consisting of vacuum, gas, liquid and any combination thereof.

16. The flexible light path guide device as claimed in claim 1, wherein the projected object is selectively an eye or a surface of any real body article.

17. The flexible light path guide device as claimed in claim 1, wherein the at least one refractive member is selected from a group consisting of a lens, a lens set composed of multiple stacked lenses, an array composed of multiple arranged lenses, an array composed of multiple arranged lens sets, a transflective layer, a transflective layer set composed of multiple stacked transflective layers, an array composed of multiple arranged transflective layers, an array composed of multiple arranged transflective layer sets and any combination thereof.

18. The flexible light path guide device as claimed in claim 1, wherein the at least one of the flexible optical guide members is a bar-shaped structure or a bending structure.

19. The flexible light path guide device as claimed in claim 1, wherein at least one of the flexible optical guide members is made from a material selected from a group consisting of plastic, glass, quartz, polydimethylsiloxane (PDMS), complex material and any combination thereof.

20. The flexible light path guide device as claimed in claim 1, wherein the at least one visible light is guided to the outer side of the flexible optical guide member, wherein the outer side is a longitudinal side of the flexible optical guide member.

* * * * *

UNITED STATES PATENT AND TRADEMARK OFFICE
CERTIFICATE OF CORRECTION

| | | |
|---|---|---|
| PATENT NO. | : 11,221,439 B2 | Page 1 of 1 |
| APPLICATION NO. | : 16/858724 | |
| DATED | : January 11, 2022 | |
| INVENTOR(S) | : Wei-Young Liang et al. | |

It is certified that error appears in the above-identified patent and that said Letters Patent is hereby corrected as shown below:

On the Title Page

Under "(72) inventors," add the following third inventor:
-- Ranjith Rajasekharan Unnithan, Melbourne (AU); --

Signed and Sealed this
Fourth Day of June, 2024

Katherine Kelly Vidal
*Director of the United States Patent and Trademark Office*